May 31, 1927.  E. E. BLUME ET AL  1,630,415
CULTIVATOR SHIELD
Filed May 7, 1925
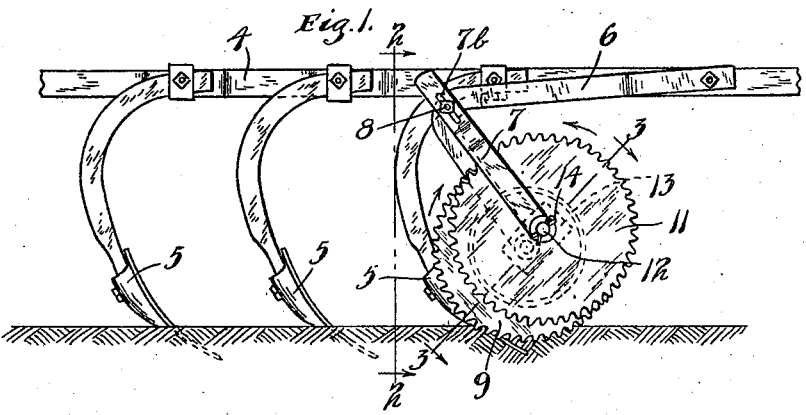
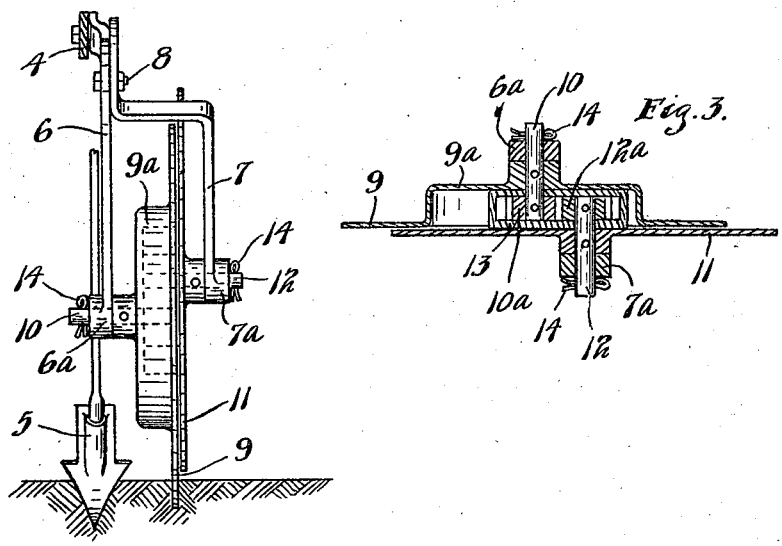
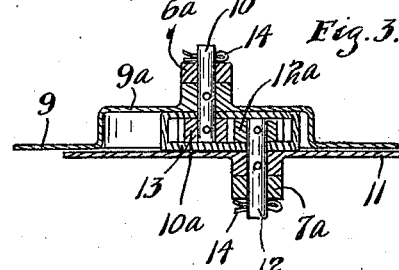
INVENTORS.
EDWARD E. BLUME.
CARL ANDERSON.
BY THEIR ATTORNEYS.

Patented May 31, 1927.

1,630,415

UNITED STATES PATENT OFFICE.

EDWARD E. BLUME AND CARL ANDERSON, OF CLAREMONT, MINNESOTA.

CULTIVATOR SHIELD.

Application filed May 7, 1925. Serial No. 28,607.

This invention relates to shields or fenders for cultivators or other ground-working agricultural implements.

Most cultivator shields and fenders at the present time employed have no means thereon for lifting plants or leaves which have blown down or been bent in the path of the shield, back out of the way of the shield or adjacent path of the cultivator.

It is the main object of this invention to provide a simple but highly efficient shield or fender for ground-working agricultural implements which will not only prevent the plowed ground from covering the plant but will, moreover, protect the leaves or stalks if the same are extended in the path thereof.

It is a more specific object of the invention to provide a cultivator shield comprising a pair of oppositely revolving disks, one of which engages the ground and is revolved by the moving of the implement thereover, the other of which is driven by said first disk in an opposite direction therefrom, thereby engaging the leaves of plants and lifting the same backwardly out of the way of the ground engaging disk and the adjacent path of the plow.

It is a further object of the invention to provide in such a device the oppositely revolving disks, one of which engages the ground, and the other of which is disposed forwardly thereof and at a higher level, thereby engaging the plants and adapted to revolve free from engagement with the ground.

It is a still further object in such a device to dispose the oppositely revolving disks in close relation, and, for the most part, overlapping each other, whereby the opposite movement thereof will, at all times, free the peripheral edges of the disks from dirt or other foreign material.

These and other objects of the invention will be apparent from the following description made in connection with the accompanying drawings, wherein like notations refer to similar parts throughout the several views, and in which Fig. 1 is a fragmentary side elevation illustrating the preferred form of the invention mounted on a corn cultivator;

Fig. 2 is a vertical section taken on the line 2—2 of Fig. 1 showing the improved shield in rear elevation; and Fig. 3 is a cross section on the line 3—3 of Fig. 1.

In the drawings, the numeral 4 denotes one side of a cultivator frame, to which in spaced diagonal relation the cultivator shovels 5 are rigidly secured. The improved shield or fender is adapted to be disposed adjacent and on the inner side of the inner cultivator shovel 5 and is secured to the frame 4 by means of a pair of elongated arms 6 and 7 having offset portions forming a fork when secured together by means of the transverse bolt 8, the main arm 6 being angularly bent and pivotally secured at its forward end to the frame 4.

Members 6 and 7, at their lower ends, are provided with the transverse substantially horizontal bearings $6^a$ and $7^a$, respectively, bearing $6^a$ being disposed somewhat below $7^a$ and somewhat rearwardly thereof. A rotatable ground engaging member, preferably in the form of a disk 9, having the central cylindrical housing $9^a$ on its outer side is rigidly secured to a transverse stub axle shaft 10, journaled in bearing $6^a$ and carrying the gear $10^a$ at the inner end thereof. A second rotatable member or disk 11 is disposed with its inner side in close relation to disk 9 and rigidly secured to the stub axle shaft 12, the outer end of which is journaled in bearing $7^a$ and the inner end of which rigidly carries the gear $12^a$ meshed with the gear $10^a$ on shaft 10. Obviously disks 9 and 11 are rotatably mounted in substantially vertical position. Gears $10^a$ and 12 are mounted within the gear casing 13, which casing is disposed between the disks 9 and 11 and within the housing $9^a$ carried by disk 9. Cotter pins 14, or other suitable means, are inserted in the end portions of the shafts 10 and 12 at the outer sides of bearings $6^a$ and $7^a$, respectively. The shorter arm 7 is provided at its upper end with a longitudinal slot $7^b$, through which the bolt 8 is adapted to be passed to secure members 7 and 6 together and allow for adjustment thereof to permit the relative position of disks 9 and 11 to be slightly varied.

The disks overlap each other for the most part but the disk 9 is disposed slightly below disk 11 and slightly rearwardly thereof. Thus disk 9 is adapted to engage the ground while disk 11 is adapted to be free from engagement with the ground and to extend forwardly of disk 9.

The operation of the device is probably obvious from the foregoing description but may be briefly summarized as follows:

When the cultivator or other implement is moved over the ground, the disk 9 will be driven in the direction of the moving machine and will drive the disk 11 in a rearward or reverse direction therefrom. Disk 11, therefore, rotating in a rearward direction and extending forwardly of disk 9, will engage the fallen leaves or stalks of the plants if the same extend in its path and will lift or carry them backward out of the way of the forwardly rotating disk 9 and out of the way of the adjacent cultivator shovel 5. The two disks 9 and 11 will, obviously, co-operate to prevent the plowed ground from being thrown up on the plants.

The oppositely revolving disks, in close overlapping relation, will strike off clots of dirt or foreign material from the outer edges of each other, thus at all times keeping the working edges of the device clean. The relative position of disk 11 with respect to disk 9 may obviously be varied somewhat by unloosening the bolt 8 and moving the arm 7 slightly downwardly or upwardly, as desired, thereby journaling the shaft 12 in a slightly different position with respect to shaft 10.

The disks, as illustrated in Fig. 1, are dragged by means of the arm 6, the forward end of which is bolted to the frame 4, permitting some pivotal motion of the arm 6 thereon.

It will be seen from the above description that a highly efficient but extremely simple cultivator shield has been invented adapted to protect the plants from being cut or run over by the ground contacting wheels and, also preventing the plowed ground from covering the plants. The invention comprises few parts and can be manufactured at little expense.

Extensive actual usage of the devices has shown it to be highly successful for the purposes intended. It is found that the ground may be plowed very close to the plants or row without any danger of damaging young plants or covering them with dirt.

It will, of course, be understood that various changes may be made in the form, details and arrangement of the parts without departing from the scope of applicant's invention, which, generally stated, consists in a device capable of carrying out the objects above enumerated and such as shown and described and set forth in the appended claims.

What is claimed is:

1. A shield for cultivators and analagous implements comprising a frame adapted to be carried at one side of a plowing element of an implement, a deflecting member journaled in said frame, and a member carried by said frame and contacting the ground adapted to drive said deflecting member in the opposite direction from the movement of the implement, and constituting a guard for preventing plowed material from spreading to the land side of said shield.

2. A shield for cultivators or analagous implements having in combination a frame adapted to be secured adjacent a plowing element of said implement, a pair of rotatable members journaled in said frame in close relation, one of said members contacting the ground and driven by the movement of the implement thereover, and the other of said members driven by said first mentioned member in the opposite direction.

3. In an agricultural implement, a shield mounted thereon, comprising a frame, a pair of disks separately journaled in said frame, one of said disks adapted to contact the ground and be driven by the movement of the implement thereover, the other of said disks being disposed slightly above said first mentioned disk, and driven thereby in the reverse direction.

4. The structure set forth in claim 4, and said second disk being also disposed forwardly of said first mentioned disk.

5. A shield for cultivators or analogous implements having in combination a frame adapted to be carried at one side of a plowing element of said implement, a pair of rotatable disks journaled in said frame on separate axes, intermeshing gears carried by said disks, one of said disks being disposed to contact the ground when being driven by the movement of the implement thereover, the other of said disks being driven in the reverse direction by the contacting disk to deflect plants or other matter from the path of said plowing element.

6. A shield for cultivators or analagous implements having in combination a frame adapted to be carried adjacent one side of a plowing element of said implement, a pair of rotatable disks independently journaled in said frame, having their adjacent faces disposed in close relation to each other, one of said disks being disposed at a lower level than said other disk and adapted to contact the ground when said implement is moved thereover, and means for driving said second disk from said first mentioned disk in the opposite direction.

7. The structure set forth in claim 7, and means for varying the position of said disks in said frame.

8. A shield for cultivators or analagous implements having in combination a frame adapted to be carried adjacent one side of a plowing element of said implement, a pair of rotatable disks each carrying an axle shaft independently journaled in said frame, a gear carried by each of said shafts, said gears being intermeshed, said disks having their inner surfaces overlapping and one being disposed at a lower level than the other.

9. The structure set forth in claim 9, a casing for said gears disposed between said disks, and one of said disks having a concaval convex portion adapted to enclose said casing.

In testimony whereof we affix our signatures.

EDWARD E. BLUME.
CARL ANDERSON.